2,815,366
Patented Dec. 3, 1957

2,815,366

PARTIAL POLYCHLORO-ALIPHATIC ACID ESTERS OF POLYHYDROXYPHENOLS

Herman O. Senkbeil, Midland, Mich., assignor to The Dow Chemical Company, Midland, Mich., a corporation of Delaware No Drawing. Application October 12, 1956,
Serial No. 615,723

6 Claims. (Cl. 260—479)

This invention relates to the partial esters of the polyhydroxyphenols and the polychloro-aliphatic monocarboxylic acids such as the $\alpha,\alpha$-dichloro-aliphatic acids and $\alpha,\alpha,\beta$-trichloro-aliphatic acids containing from 3 to 5 carbon atoms, inclusive, and trichloroacetic acid. These compounds are viscous liquids or crystalline solids which are somewhat soluble in many organic solvents and of low solubility in water. They are useful as plant growth materials and are adapted to be employed in dust and spray compositions for the control of the growth and the killing of weeds and for the sterilization of soil with regard to plant growth. They are also useful as parasiticides for the control of many pests such as *Erwinia carotovora* and *Salmonella typhosa*.

The new compounds may be prepared by reacting together (1) a polyhydroxyphenol and (2) a polychloro-lower aliphatic-monocarboxylic acid anhydride having the formula

wherein R represents an $\alpha,\alpha$-dichloroacyl or $\alpha,\alpha,\beta$-trichloroacyl radical containing from 3 to 5 carbon atoms, inclusive, or trichloroacetyl. Suitable polyhydroxyphenols include pyrocatechol, hydroquinone, resorcinol, pyrogallol, phloroglucinol or 1,2,4,5-benzene tetrol. The reaction takes place smoothly at the temperature range of from 90° to 170° C. with the formation of the desired partial ester and polychloro-lower aliphatic acid of reaction. The employment of the proportion of at least one mole of polyhydroxyphenol with an amount of the polychloro-lower aliphatic acid anhydride equal in moles to one less than the number of hydroxyl units in the employed polyhydroxyphenol is essential for the synthesis of the partial esters. The employment of a small excess of the polyhydroxyphenol and the removal from the reaction zone of the polychloro-lower aliphatic-monocarboxylic acid of reaction as formed generally results in optimum yields of the desired ester products.

In carrying out the reaction, the polychloro-lower aliphatic acid anhydride and polyhydroxyphenol are mixed together and the resulting mixture heated at a temperature of from 90° to 170° C. for a period of time to complete the reaction. The heating may be carried out under reduced pressure and at a temperature at or above which the polychloro-lower aliphatic acid of reaction boils to effect the removal of by-product polychloro-aliphatic acid as formed. Upon completion of the reaction, the desired product may be separated by fractional distillation under reduced pressure. When the desired product precipitates as a crystalline solid in the cooled reaction mixture, it may be separated and purified by recrystallization from various organic solvents.

The following examples illustrate the invention but are not to be construed as limiting:

*Example 1.*—Pyrocatechol mono-($\alpha,\alpha$-dichloropropionate)

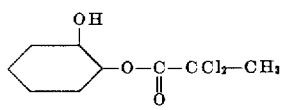

A mixture of 77 grams (0.7 mole) of pyrocatechol and 94 grams (0.35 mole) of $\alpha,\alpha$-dichloropropionic anhydride was heated with stirring for 6 hours at a temperature of from 109° to 123° C. and at a reduced pressure of 10 millimeters. The heating was carried out with the continuous distillation of the $\alpha,\alpha$-dichloropropionic acid of reaction as formed, and until no further substantial amounts of acid were liberated. The residue was thereafter fractionally distilled under reduced pressure to separate a pyrocatechol mono-($\alpha,\alpha$-dichloropropionate) product as a viscous liquid. This product had a boiling point of 85°–86° C. at 0.08 millimeter pressure and a saponification equivalent of 231 compared to the theoretical value of 235.

*Example 2.*—Pyrocatechol mono-($\alpha,\alpha,\beta$-trichloropropionate)

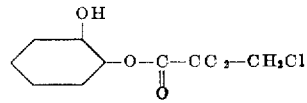

A mixture of 57.3 grams (0.52 mole) of pyrocatechol and 88.7 grams (0.26 mole) of $\alpha,\alpha,\beta$-trichloropropionic anhydride was heated with stirring for 6 hours at a temperature of from 106° to 128° C. and at a reduced pressure of 5 millimeters. The heating was carried out with the continuous distillation of the $\alpha,\alpha,\beta$-trichloropropionic acid of reaction as formed and until no further substantial amounts of acid were liberated. The reaction mixture was then fractionally distilled under reduced pressure to separate a pyrocatechol mono-($\alpha,\alpha,\beta$-trichloropropionate) product as a viscous liquid boiling at 100°–108° C. at 0.08 millimeter pressure.

*Example 3.*—Pyrogallol bis($\alpha,\alpha$-dichloropropionate)

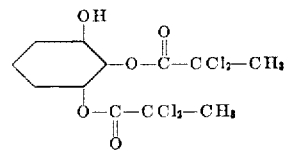

Pyrogallol (25.2 grams, 0.2 mol) and 107.2 grams (0.4 mole) of $\alpha,\alpha$-dichloropropionic anhydride are mixed and resulting mixture heated with stirring at a temperature of from 90° to 124° C. and at a reduced pressure of 10 millimeters. The $\alpha,\alpha$-dichloropropionic acid of reaction is continuously removed as formed by distillation during the heating period. Toward the end of the heating period, no further substantial amount of $\alpha,\alpha$-dichloropropionic acid is liberated. Upon cooling the reaction mixture a pyrogallol bis($\alpha,\alpha$-dichloropropionate) product is obtained as a white crystalline solid. Pyrogallol bis-($\alpha,\alpha$-dichloropropionate) has a melting point of 83°–85° C.

*Example 4.—Pyrogallol bis(α,α,β-trichloropropionate)*

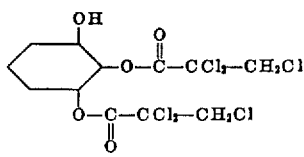

A mixture of 25.2 grams (0.2 mole) of pyrogallol and 134.8 grams (0.4 mole) of α,α,β-trichloropropionic anhydride is heated with stirring at a temperature of from 115° to 137° C. and at a reduced pressure of 5 millimeters. During the heating period, the α,α,β-trichloropropionic acid of reaction is continuously distilled from the reaction zone as formed. Upon completion of the reaction, the reaction mixture is fractionally distilled under reduced pressure at temperatures gradually increasing up to a temperature of 170° C. at 1.5 millimeters pressure to obtain a pyrogallol bis(α,α,β-trichloropropionate) product as a viscous liquid residue having a molecular weight of 445 and a chlorine content of 48.1 percent.

*Example 5.—Resorcinol mono-(α,α-dichlorobutyrate)*

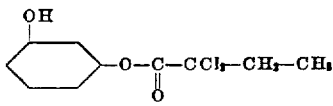

This compound is prepared in a manner similar to that described in Example 1 by the reaction of one mole of resorcinol with one mole of α,α-dichlorobutyric anhydride. Upon completion of the reaction, the reaction mixture is fractionally distilled under reduced pressure to obtain the desired monoester product as a viscous liquid having a molecular weight of 250.

*Example 6.—Pyrogallol mono-(α,α-dichloropropionate)*

A mixture of 0.75 mole of pyrogallol and 0.25 mole of α,α-dichloropropionic anhydride was heated for one hour at a temperature of from 75° to 80° C. and then for 20 minutes at a temperature of from 110° to 115° C. Upon cooling the reaction mixture, the desired pyrogallol mono-(α,α-dichloropropionate) product was obtained as a crystalline solid. This product was recrystallized from a chlorobenzene-petroleum ether mixture and melted at 105°–108° C. It had a chlorine content of 28.3 percent which corresponds to the calculated chlorine content.

*Example 7.—1,2,4,5-benzenetetrol bis-(trichloroacetate)*

A mixture consisting of 0.14 mole of 1,2,4,5-benzenetetrol and 0.31 mole of trichloroacetic anhydride is heated with stirring under reduced pressure and at a temperature at which the trichloroacetic acid of reaction is continuously distilled as formed from the reaction zone. The heating is carried out until no further substantial amount of trichloroacetic acid is evolved. The residue is fractionally distilled under reduced pressure to separate the desired ester product which has a molecular weight of 400.

In a similar manner other partial chloroaliphatic acid esters of polyhydroxyphenols may be prepared of which the following are representative:

Hydroquinone mono-(α,α,β-trichlorovalerate) by the reaction of hydroquinone with an equimolar amount of α,α,β-trichlorovaleric anhydride.

Phloroglucinol bis-(α,α-dichlorobutyrate) by the reaction of one mole of phloroglucinol with two moles of α,α-dichlorobutyric anhydride.

Resorcinol mono-(α,α-dichloropropionate) by the reaction of resorcinol with an equimolar amount of α,α-dichloropropionic anhydride.

1,2,4-trihydroxybenzene bis-(α,α,β-trichloroacetate) by the reaction of 2 moles of α,α,β-trichloroacetic anhydride with one mole of 1,2,4-trihydroxybenzene.

Resorcinol mono-(α,α-dichlorovalerate) by the reaction of resorcinol with an equimolar amount of α,α-dichlorovaleric anhydride.

Hydroquinone mono-(α,α,β-trichlorobutyrate) by the reaction of hydroquinone with an equimolar amount of α,α,β-trichlorobutyric anhydride.

The new compounds of the present invention are effective as herbicides for the killing of weeds and for the sterilization of soil with regard to plant growth. They are also useful as parasiticides and are adapted to be employed for the control of bacterial organisms such as *Aspergillus terreus* and *Penicillium digitatum*. For such use the products may be dispersed on an inert finely divided solid and employed as dusts. Such mixtures may also be dispersed in water with or without the aid of a wetting agent and the resulting aqueous suspensions employed as sprays. In other procedures, the products may be employed as active toxic constituents in oil-in-water emulsions or aqueous dispersions with or without the addition of wetting, dispersing, or emulsifying agents. In representative operations, 100 percent controls of the growth of the seeds and emerging seedlings of millet and wild oats have been obtained with pyrogallol bis(α,α-dichloropropionate) when applied at the rate of 50 pounds per acre to soil previously planted with said species.

I claim:

1. A partial ester of a polyhydroxyphenol and a polychloro-aliphatic acid selected from the group consisting of the α,α-dichloro-aliphatic acids containing from 3 to 5 carbon atoms, inclusive, the α,α,β-trichloro-aliphatic acids containing from 3 to 5 carbon atoms, inclusive, and trichloroacetic acid.
2. Pyrocatechol mono-(α,α-dichloropropionate).
3. Pyrocatechol mono-(α,α,β-trichloropropionate).
4. Pyrogallol bis-(α,α-dichloropropionate).
5. Pyrogallol bis-(α,α,β-trichloropropionate).
6. Pyrogallol mono-(α,α-dichloropropionate).

No references cited.

UNITED STATES PATENT OFFICE
Certificate of Correction

Patent No. 2,815,366                                                December 3, 1957

Herman O. Senkbeil

It is hereby certified that error appears in the printed specification of the above numbered patent requiring correction and that the said Letters Patent should read as corrected below.

Column 2, lines 29 to 33, Example 2, the formula should appear as shown below instead of as in the patent—

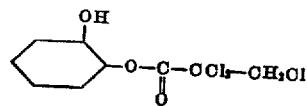

line 56, for "and resulting" read —and the resulting—.

Signed and sealed this 20th day of May 1958.

[SEAL]

Attest:
KARL H. AXLINE,
*Attesting Officer.*

ROBERT C. WATSON,
*Commissioner of Patents.*